Patented May 27, 1941

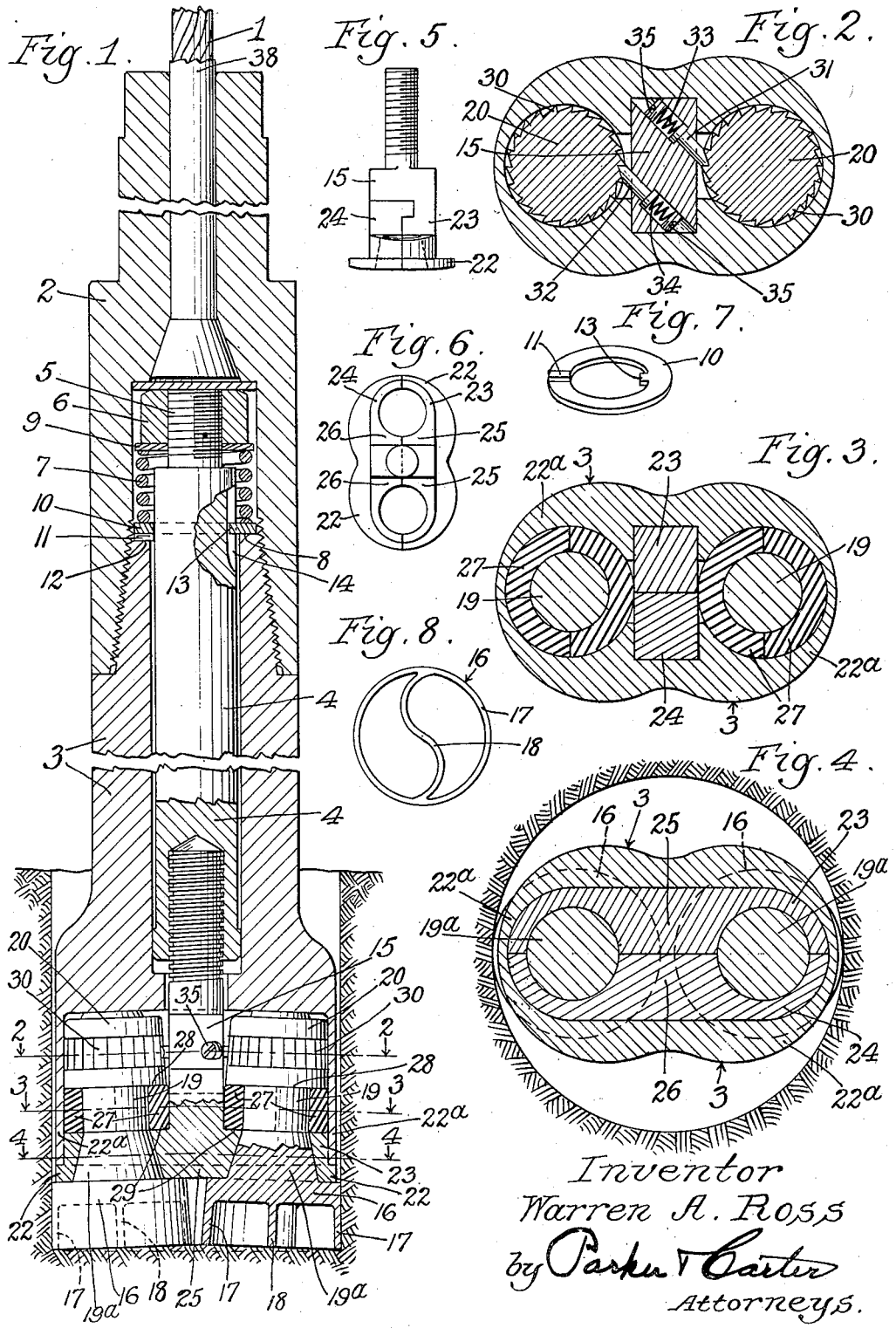

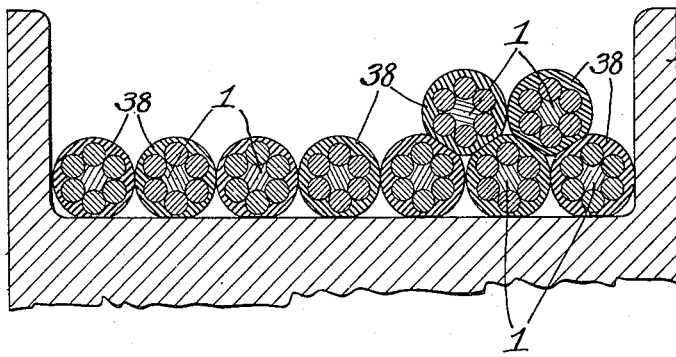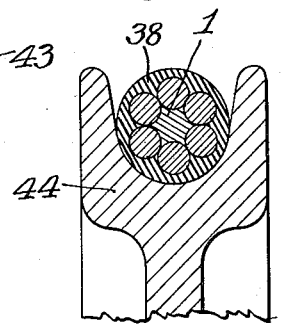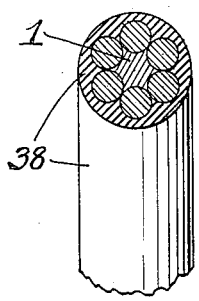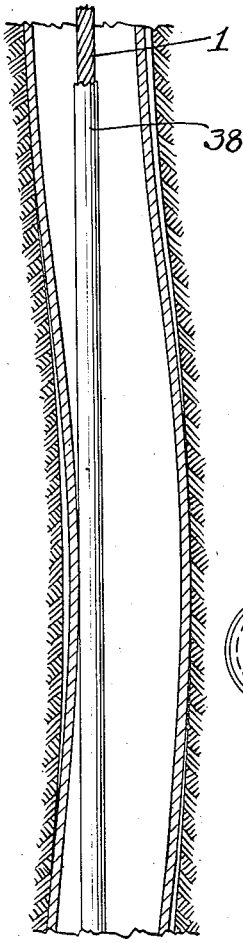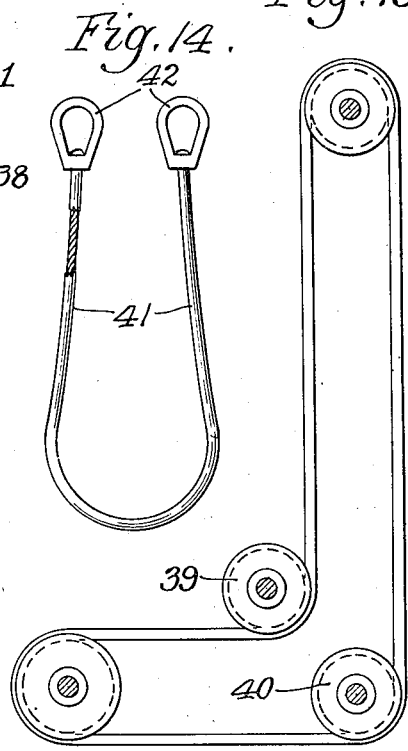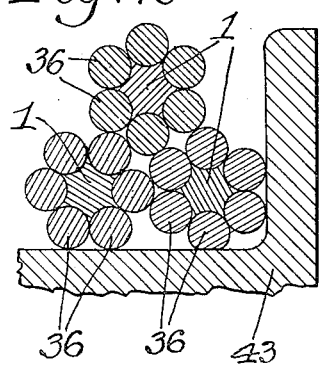

2,243,319

UNITED STATES PATENT OFFICE 2,243,319

DRILLING DEVICE

Warren A. Ross, Haverhill, Mass., assignor to Donald M. Carter, Chicago, Ill.

Application April 5, 1938, Serial No. 200,211

8 Claims. (Cl. 255—71)

This invention relates to drilling devices and has for its object to provide a new and improved device of this description.

The invention has a further object to provide a drilling device particularly adapted for use as a percussion drill. The invention has as a further object to provide a percussion drilling device with means for preventing the drilling members from being broken when in operation. The invention has a further object to provide a drilling device with means for limiting the rotation of the drilling device to a movement always in the same direction.

The invention has as a further object to provide a drilling device with cushioning members interposed between the cutting devices and the cutter holder. The invention has as a further object to provide a drilling device with means for causing an even wear on the cutting edges.

The invention has other objects which are more particularly pointed out in the accompanying description.

Referring now to the drawings, wherein I have shown one form of device embodying the invention, Fig. 1 is a view in part section showing one form of drilling device embodying the invention;

Fig. 2 is a sectional view taken on line 2—2 of Fig. 1;

Fig. 3 is a sectional view taken on line 3—3 of Fig. 1;

Fig. 4 is a sectional view taken on line 4—4 of Fig. 1;

Fig. 5 is a reduced view of the cutter holder as seen at right angles from its position in Fig. 1;

Fig. 6 is a plan view of Fig. 5;

Fig. 7 is a perspective view of the washer which prevents rotation of the cutting supporting member with relation to the cutter holder;

Fig. 8 is a bottom view of one form of cutter;

Fig. 9 is a view showing the rubber covered cable;

Fig. 10 is a view of a portion of the well and the casing, showing the rubber covered cable in contact with the casing;

Fig. 11 is a sectional view showing a portion of the cable wound upon the drum;

Fig. 12 is a sectional view of a portion of a pulley with the rubber covered cable passing thereover;

Fig. 13 is a view showing how the rubber covered cable can be used where it is necessary to turn a corner;

Fig. 14 shows the rubber covered cable used as a sling;

Fig. 15 is a sectional view of one of the strands of the cable showing the wires from which it is made; and Fig. 16 is a sectional view showing several sections of the cable in contact under pressure as in use, showing the uneven distribution of the pressure.

Like numerals refer to like parts throughout the several figures.

Referring now to the drawings, I have shown in Fig. 1 the bottom end of the cable 1 which extends to the top of the well or hole being drilled. This cable is attached to the member 2, which in turn is attached to the cutter head 3. The cutter head is hollow and extending up through it is the cutter holder supporting member 4 which has a threaded upper end 5 upon which is a nut 6. There is a spring 7 between the nut 6 and a shoulder 8 on the cutter head 3. There are preferably washers 9 and 10 inserted between the spring and the nut 6 and shoulder 8. Some means is provided for preventing the member 4 from rotating with relation to the cutter head 3. In the construction shown, the washer 10 performs this function. It has a projection 11 which fits in a recess 12 in the cutter head 3 and a projection 13 which fits in a groove 14 in the member 4. The projection 11 prevents the washer and associated parts from rotating with relation to the cutter head 3 and the projection 13 prevents the part 4 from rotating, but permits the part 4 to move up and down with relation to the cutter head. Attached to the cutter head 3 is a cutter holder 15. There are provided one or more cutters 16 which are rotatably mounted in the cutter holder. These cutters may be of any form desired. As herein shown, the cutter is a hollow cup shaped cutter with a comparatively thin outer cutting member 17 and a comparatively thin cross cutting member 18, the cutting members being arranged so that they remain substantially the same thickness as they wear away.

The cutter head 3 is preferably recessed at the bottom and the cutters 16 are provided with shanks 19 which have enlarged ends 20. The cutter holder 15 is removably connected with the cutter holder supporting member 4. In the construction shown, there is a screwthreaded connection between the cutter holder supporting member and the cutter holder. The cutter holder is provided at its bottom with an enlargement which preferably consists of two separate members 23 and 24, so that it may be easily placed in position, see Figs. 1 and 4. These parts surround the parts 19a and have portions 25 and 26 which project in between the cutters, as clearly shown in Figs. 1 and 4, and are preferably provided with a laterally projecting shoulder 22 which projects under the outer part 22a of the cutter head, see Fig. 1. Located between the enlargement at the end of the cutter holder 15 and the enlargements 20 of the cutters are cushioning members 27. These cushioning members are preferably made in sections, see Fig. 3, so that they may be easily and quickly placed about the shanks 19 of the cutters, and are made of any suitable cushioning material, preferably rubber. These cushioning devices are located between a shoulder 28 on the cutters and a shoulder 29 of the cutter holder, the upper part above the cushioning devices having a slight taper to facilitate the assembling of the parts.

Some means is provided for causing the cutters to rotate when they are in operation in one direction only and prevent rotation in the other direction. One means for securing this result is shown in the drawings. In this construction the shanks of the cutters are provided with ratchets 30 and the cutting holder 15 is provided with pawls 31 and 32 which engage these ratchets 30 and which are pressed toward the ratchets by springs 33 and 34. These springs are held in position by the screwplugs 35. It will be seen that these pawls permit the cutters to rotate in one direction and prevent their rotation in the opposite direction.

It will be noted that the outer faces of the cutters engage the wall of the hole. As the cable and cutters are moved up and down during their operation, the cable turns in both directions. Since the cutters engage the wall of the hole, this friction causes them to rotate when the twisting and turning movement of the cable and associated parts is such as to let the pawls 31 and 32 slide over the ratchet teeth so that the cutters rotate with relation to the cutter holder, and when the cable and associated parts rotate in the other direction the pawls carry the cutters with them, and it will be seen that this results in a continuous change in position of the cutting edge of the cutter. This therefore causes the cutters to continuously rotate in one direction and this produces an even wear on the cutting edges of the cutters.

One of the difficulties in drilling oil wells is the hard usage and wear and strain on the cables. These cables, for example, are wound upon a drum and are made of a series of strands 36 of wire, see Fig. 16, each strand being made up of a plurality of wires 37, see Fig. 15. As these cables are wound up on the drum they are under great tension as they bear the weight of the cable in the well and the drilling devices attached thereto. Under these conditions it often happens that the entire force of the contact comes upon but one small individual strand of each portion of the contacting cable. Furthermore, as these strands contact, since they are not parallel, there is a tendency for them to move or slide upon each other. It will therefore be seen that all or a very large amount of the pressure due to the weight on the cable must be resisted by a single strand. This pressure and relative sliding movement causes the strands of the cable to be worn and broken, the result being that the cable is very quickly weakened so that it has to be removed. Furthermore, in drilling a well, it often happens that the hole does not go straight down but bends to one side or the other, and the cable, therefore, as it moves up and down in actuating the cutters, slides along the inner wall of the casing of the well, as shown in Fig. 10, and since the contact between the casing and the cable comes upon practically one strand of the cable, this not only causes the cable to be quickly worn, so that it has to be renewed, but also tends to wear the casing and in some cases causes holes to be made in the casing, letting the water run in so as to spoil the well.

To prevent these evils, I provide the cable with an elastic tenacious covering 38 which has a smooth outer surface and which gives as the two smooth surfaces of the cable sections engage, so as to present a large area of contact and so as to prevent the strands of the cable from contacting or from rubbing against anything or from being worn. This covering distributes the pressure through the cable to the various strands and thus entirely prevents the wearing of the strands of the cable. I prefer to make this covering of rubber, as rubber has the quality of being elastic and of also being tenacious and of resisting wear due to weight or friction. This rubber covering may be put upon the cable in any desired manner. One method is by the extruding process. The rubber may be made in tubular form and slipped onto the cable, or it may be made in half sections of the tube and placed on the cable, the abutting edges being then fastened together in any desired manner. The rubber may, of course, be applied in any other manner desired. This covering prevents the strands of the cable from engaging each other, provides a large area of contact between the sections of the cable when they are wound on the drum, prevents contact of the wires or strands of the cable with each other, distributes the pressure through the various strands, and thus very greatly lengthens the life of the cable. This rubber covering, when the cable strikes the casing, prevents both the wear on the cable and the wear on the casing. Furthermore, when the cable is wound upon the drum 43, as shown in Fig. 11, so that the strands engage each other, the rubber takes the pressure and prevents the strands of the cable from coming into contact and from thus becoming worn.

When a single cable is used, as, for example, upon a pulley 44, the rubber engages the face of the pulley and prevents the strands of the cable from being worn. Also, by means of this device I am enabled to use the cable effectively where it must be passed around grooved pulleys 39 and 40, see Fig. 13, to change its direction, as the pulley can engage either side or surface of the cable. This rubber covered cable has other uses and I have shown one in Fig. 14 where it is used as a sling 41 which may be thrown around anything that must be lifted, the end pieces 42 being connected with the lifting apparatus.

There is also an additional strain on the strands of the cable when it is on the reel, by the reversal of the cutting device, that is, due to the dropping and then the sudden reversing and lifting of the cutting device. I have illustrated the sections of the cable by simply cross hatching the strands because of the small size of the drawings, but it is of course understood that the strands will be made up of different wires, as clearly shown in Fig. 15. Fig. 16 shows the cable without the elastic tenacious covering and this shows the action of the cable without this covering, showing that the weight on any portion of the overlapping cable is taken by one or two strands, and that the strands as the cable is wound, slide upon each other under the pressure as they come to their stable positions.

The cutter engaging member 15 is made into two parts 23 and 24 so that the parts 19a of the shank 19 of the cutter may be entered in the bearing portion provided in the two members 23 and 24 and then the member 15 with the cutters 16 may be easily placed in position in the cutter holder 3. I have shown the parts 19a as being tapered or enlarged near the cutter 16, for adding strength to the parts, but these parts may be cylindrical if desired.

I have shown in detail a particular construction embodying the invention, but it is of course evident that the parts may be varied in many particulars without departing from the spirit of the invention as embodied in the claims hereto appended, and I therefore do not limit myself to the particular construction shown.

The use and operation of my invention are as follows.

When the device is in use the cutters are moved up and down and as they drop, strike the bottom of the hole so as to engage the material at the bottom of the hole and loosen it so that it may be removed from the hole. When the cutters strike the bottom of the hole their speed of motion is of course reduced, but they do not entirely stop as the material under them gives way due to the blows. There is then a recoil and the cutter holder and cable move up. During these movements the affect of the blows and recoil upon the cutter is cushioned by the cushioning devices 27. These cushioning devices prevent the cutters from being fractured, or broken, or cracked, so that they must be replaced. During this reciprocating movement the cutter holder 3 is prevented from rotating with relation to the part 2 and the cable 1 by means of the washer 10, the projecting part 11 fitting into the recess 12 of the cutter head and the projection 13 fitting into the groove 14 in the cutter holder supporting member 4. This latter construction permits the cutter holder supporting member to move longitudinally with relation to the cutter head, as the spring 7 compresses and expands due to the downward and upward movement of the parts. The cutters as they move up and down and strike the bottom of the hole, rotate in one direction only and are prevented from rotating in the opposite direction by the pawls 31 and 32.

The cable at the top of the hole is raised and lowered to secure the reciprocating action of the drills and this cable is pulled back while the cutters are still tending to go down through the loosening material at the bottom of the hole, so that the cutters and the cable are for a period tending to move in the opposite direction. The shock absorbing devices then act to return the cutters to their normal position in relation to the cutter head. The stretch in the cable may be considerable, depending upon the depth of the hole, and may be from two to six feet or more.

By means of this device, in addition to preserving the cutters and preventing them from being cracked or broken, the vertical movement of the cutters will be decreased without decreasing the effective cutting blows and the speed of the blows may be increased and the weight of the parts decreased, thereby saving power and increasing the speed of the drilling and at the same time having less wear and tear on the parts.

Furthermore, by means of the rubber covered cable, I prevent the cable itself and the casing from being worn as the cable is moved up and down to operate the drills, and I also prevent the wearing of the cable as it is wound upon the drum.

I claim:

1. A drilling device comprising a cutter head, a cutter holder connected with the cutter head, a cutter separate from the cutter holder, a connection between the cutter and the cutter holder, and a cushion member interposed between the cutter and that portion of the cutter holder with which the cutter is connected.

2. A drilling device comprising a cutter head, a cutter holder connected with the cutter head, a cutter separate from the cutter holder, a connection between the cutter and the cutter holder, and a cushion member interposed between the cutter and that portion of the cutter holder with which the cutter is connected, said cutter holder formed in separated parts to facilitate attaching it to the cutter.

3. A drilling device comprising a cutter head recessed at its end, a cutter in this recess having a shank and an enlargement beyond the shank, a separate cutter holder connected with the cutter head and having a laterally projecting part which surrounds said shank, and a cushion member between the cutter holder and said enlargement.

4. A drilling device comprising a cutter head, a cutter holder mounted in said cutter head and having a laterally projecting part, a cutter separate from said cutter holder and rotatably mounted in the laterally projecting part of said cutter holder, and means on the interior of said cutter head for limiting the rotative movement of the cutter to one direction.

5. A drilling device comprising a cutter head, a cutter holder mounted in said cutter head and having a laterally projecting part, a cutter separate from said cutter holder and rotatably mounted in the laterally projecting part of said cutter holder, and means on the interior of said cutter head for limiting the rotative movement of the cutter to one direction, said means comprising a ratchet connected with said cutter and a pawl associated with the cutter holder for preventing the backward movement of said ratchet.

6. A drilling device comprising a cutter head, recessed at its end, a cutter in this recess having a shank and an enlargement beyond the shank, a cutter holder having a laterally projecting part, said cutter holder connected with the cutter head and surrounding said shank, a cushion member between the laterally projecting part of said cutter holder and said enlargement, a ratchet on said shank and a pawl engaging said ratchet to insure the cutter rotating always in one direction.

7. A drilling device comprising a cutter head, recessed at its end, a plurality of cutters having shanks which project into this recess, a cutter holder connected with the cutter head, said cutter holder having a part which extends between the shanks of said cutters and laterally projecting parts connected with the shanks of said cutters, and cushion members between the laterally projecting parts of said cutter holder and said cutters.

8. A drilling device comprising a cutter head, a cutter holder on the interior of said cutter head, a cutter holder supporting member located on the interior of said cutter head, an actuating device for said cutter head connected with said cutter holder supporting member, a cutter projecting from said cutter head, and means for preventing said cutter holder supporting member and cutter head from rotating with relation to each other.

WARREN A. ROSS.